United States Patent [19]

Weinger

[11] 4,149,185
[45] Apr. 10, 1979

[54] APPARATUS AND METHOD FOR ANIMATED CONVERSION OF BLACK AND WHITE VIDEO TO COLOR

[76] Inventor: Ralph Weinger, 7819 Deer Run Rd, Philadelphia, Pa. 19118

[21] Appl. No.: 774,634

[22] Filed: Mar. 4, 1977

[51] Int. Cl.² .................. H04N 1/46; H04N 9/535; H04N 9/04
[52] U.S. Cl. .................................. 358/81; 358/80
[58] Field of Search ............... 358/81, 82, 80, 28, 358/54, 75, 22, 6, 76, 126, 37

[56] References Cited

U.S. PATENT DOCUMENTS

| | | | |
|---|---|---|---|
| 2,790,844 | 4/1957 | Neugebauer | 358/80 |
| 2,799,722 | 7/1957 | Neugebauer | 358/80 |
| 3,848,856 | 11/1974 | Reeber et al. | 358/76 |
| 3,971,068 | 7/1976 | Gerhardt et al. | 358/82 |

Primary Examiner—John C. Martin
Attorney, Agent, or Firm—Woodcock, Washburn, Kurtz & Mackiewicz

[57] ABSTRACT

Apparatus is disclosed for conversion of black and white video signals to color video signals, featuring programmable means for animated adjustment of the coloring of one or more areas of the resulting TV picture. The black and white video signal is processed through a luminance channel and two color information channels, the apparatus providing means for modifying the video signal in each channel in accordance with one or more operator-determined transfer functions, each channel further providing means for further modifying the function-modified video signals as a function of area signals generated by separate sources. The function and area-modified video signals are summed in each channel to provide the required 3 signals for a composite video signal. The process of this invention is carried out by the operator making function selections, the selected plurality of separate functions being chosen to modify color components in accordance with operator choice. Area-modifying signals are also selected, either from direct operator-controlled sources or from a variety of automated sources under operator control, the area signals being time variable so as to provide animated selected coloring.

58 Claims, 11 Drawing Figures

APPARATUS AND METHOD FOR ANIMATED CONVERSION OF BLACK AND WHITE VIDEO TO COLOR

BACKGROUND OF THE INVENTION

1. Field of the Invention

This invention relates to video color synthesizers and, more particularly, to apparatus and techniques for transforming black and white video signals to corresponding color signals, the transformed color signals containing operator-controlled localized area color components which supplement the overall color transformation of the video signal.

2. Description of the Prior Art

Video coloring apparatus and techniques, whereby black and white video signals are transformed into color video signals, have been available for some time. However, such prior art devices and techniques are based predominantly, if not solely, upon techniques for transformation of grey levels of the black and white signal into corresponding color signals. By this technique, the incoming black and white video signal is effectively digitized, with amplitudes which fall within a predetermined number of discrete levels on the white to black scale being assigned corresponding colors. However, this technique of color transformation, or color conversion, carries the basic deficiency that the signal which is being processed simply does not carry information corresponding to the color components. In making a direct transformation from black and white to color, as is done in the prior art, no new information is in fact added to the color converted signal. Thus, all signals within a given grey level range are transformed into the same corresponding color, whereas in fact such grey levels may originally have been produced from distinctly different colors having the same shades of brightness. For this reason, unless and until additional information is put into the composite signal it remains virtually impossible to perfect a straight color conversion from black and white to color. Typical of the product which results from prior art color converting techniques is the color picture where a certain portion of the overall picture is well optimized, but another portion or another feature stands out as being poorly converted. For example, in an outdoor scene, bright portions of the frame may have a very excellent color, while shady portions have a poor color. Likewise, it frequently occurs that the background of a frame may have very excellent color, whereas the face of an individual may be clearly untrue in its coloring. The problem is acute, inasmuch as if any one sensitive portion of the frame is poorly color converted, the viewer senses this immediately and records displeasure with the entire scene. Color viewing is very subjective, and generally the viewer is sensitive to the coloring of certain features in an area or areas of the overall picture, to the relative exclusion of others. If the coloring of such color sensitive areas can be fine tuned without affecting the remaining portions, a highly acceptable final picture is achieved.

There currently exists a very strong demand to obtain a satisfactory technique for color converting black and white TV recordings and films. There exist large libraries and quantities of film and TV recordings in their original black and white state. If such films, which can be converted to black and white video signals by conventional means, and other video recordings, were available in satisfactory color, their value would increase manyfold. However, prior attempts to provide such color conversion have simply not been commercially acceptable, either because the end product was not artistically acceptable or because the operation was too expensive. This is evidenced by the fact that large numbers of prior films and recordings which were made in black and white simply are not utilized by the TV networks which show virtually no programs which are not in color.

SUMMARY OF THE INVENTION

It is an object of this invention to provide apparatus for improved and inexpensive color conversion of black and white video signals.

It is another object of this invention to provide improved color conversion apparatus whereby an operator may easily and efficiently provide artistic input to the color conversion procedure.

It is another object of this invention to provide a method of color conversion which is easily performed by an operator of ordinary skill in the art of color animation.

It is another object of this invention to provide apparatus which may be manually and/or automatically controlled to provide improved color conversion of black and white video signals, the control including inputting selected color information which may be variable for different frames and for different areas of any given frame.

It is another object of this invention to provide improved means and an improved method for color conversion of black and white video signals, and to provide for animated area control of the color conversion.

It is another object of this invention to provide a low cost and commercially feasible technique of color conversion, which technique provides a substantial improvement over prior art grey level to color transforming techniques.

It is another object of this invention to provide a relatively low cost system, utilizing conventional components, which enables an operator or ordinary skill in animation to animate desired colors to coordinate with selected moving images of the video signal.

It is a still further object of this invention to provide color conversion apparatus for transforming black and white video signals to color video signals, and incorporating means for soft edged area modification of the color composition of the video signal.

It is a still further object of this invention to provide a device and method for producing a color converted video signal from an original black and white signal, which color converted signal may contain as a component thereof the original black and white signal as the luminance signal.

It is still further object of the invention to provide a system for generating color converted video signals, which system may be used in combination with conventional film to video and video to film apparatus.

It is a still further object of the invention to provide a system for real time area modified color converting of video signals.

In accordance with the above objectives, there is provided a color converting system which receives a black and white video signal as a first input and is adapted to enable an operator to produce therefrom a color converted composite signal containing color components, adapted for color TV. The system generates, independently of the black and white video signal, one or more area signals for modifying the video signal corresponding to preselected areas of the overall picture. The black and white signal is first modified by a matrix of function generators under operator control to provide a plurality of color converted signals, which signals are further modified under operator control by the area signals, to provide the composite color signal. In carrying out the process of this invention, the operator makes choices of the function modifications applied to the black and white signal, as well as the area modifications and animation of the area modification signals, thereby providing the operator's own artistic input to the composite color video signal. It is the additional information and the ease and speed with which it is logically introduced into the signal by the area signals, as well as the artistic input of the operator in selecting the area modifications, which provides the primary advantages of the system of this invention over the prior art. The system produces a color video signal which may contain the original unmodified luminance signal and thus is fully compatible for black and white as well as color modification.

DESCRIPTION OF THE PREFERRED EMBODIMENTS

Figure 1:
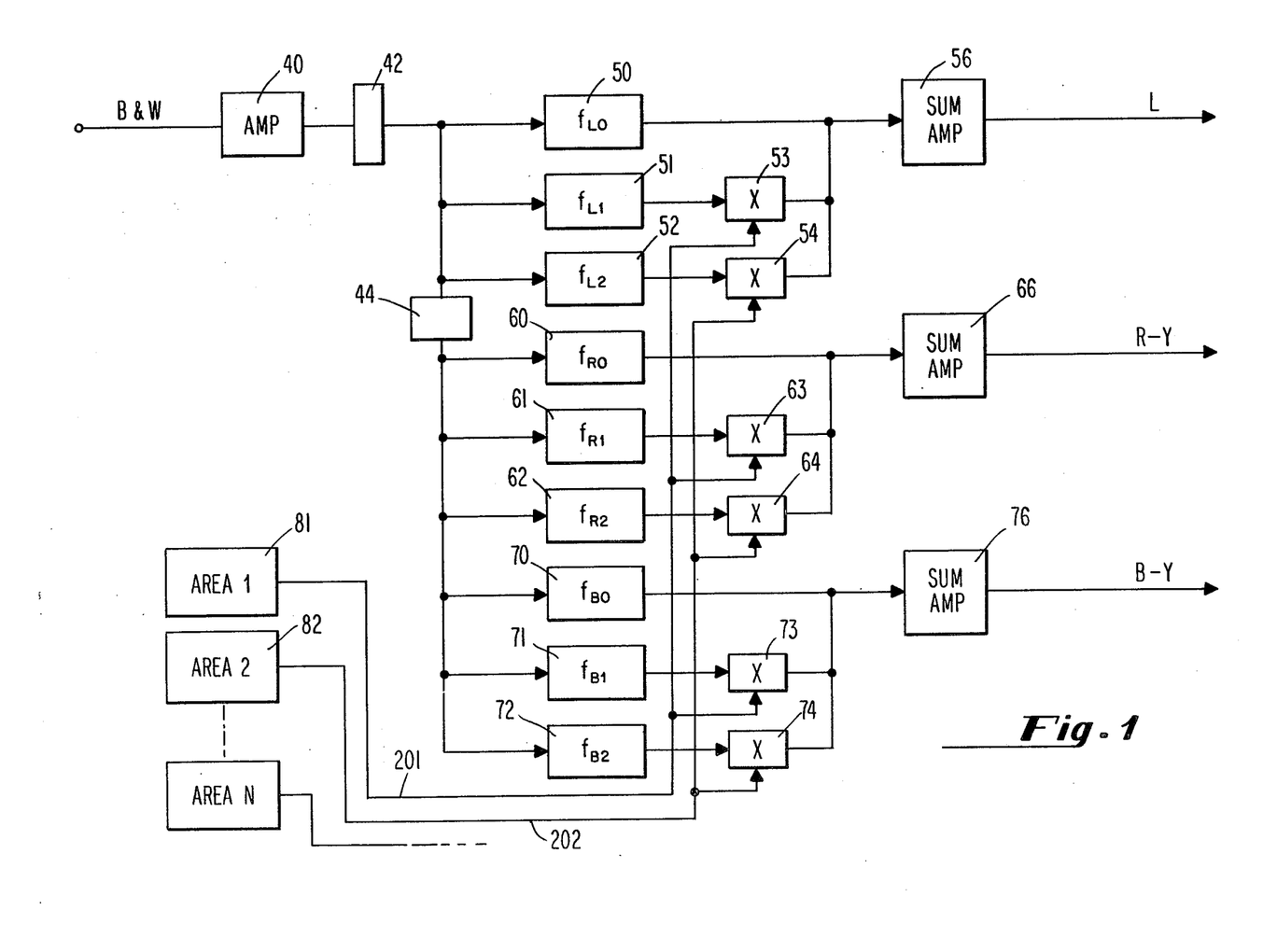
FIG. 1 is a block diagram illustrating the main logic portion of the apparatus of this invention, whereby additional color function and area signal inputs are provided to convert the black and white video signal.
Figure 2:
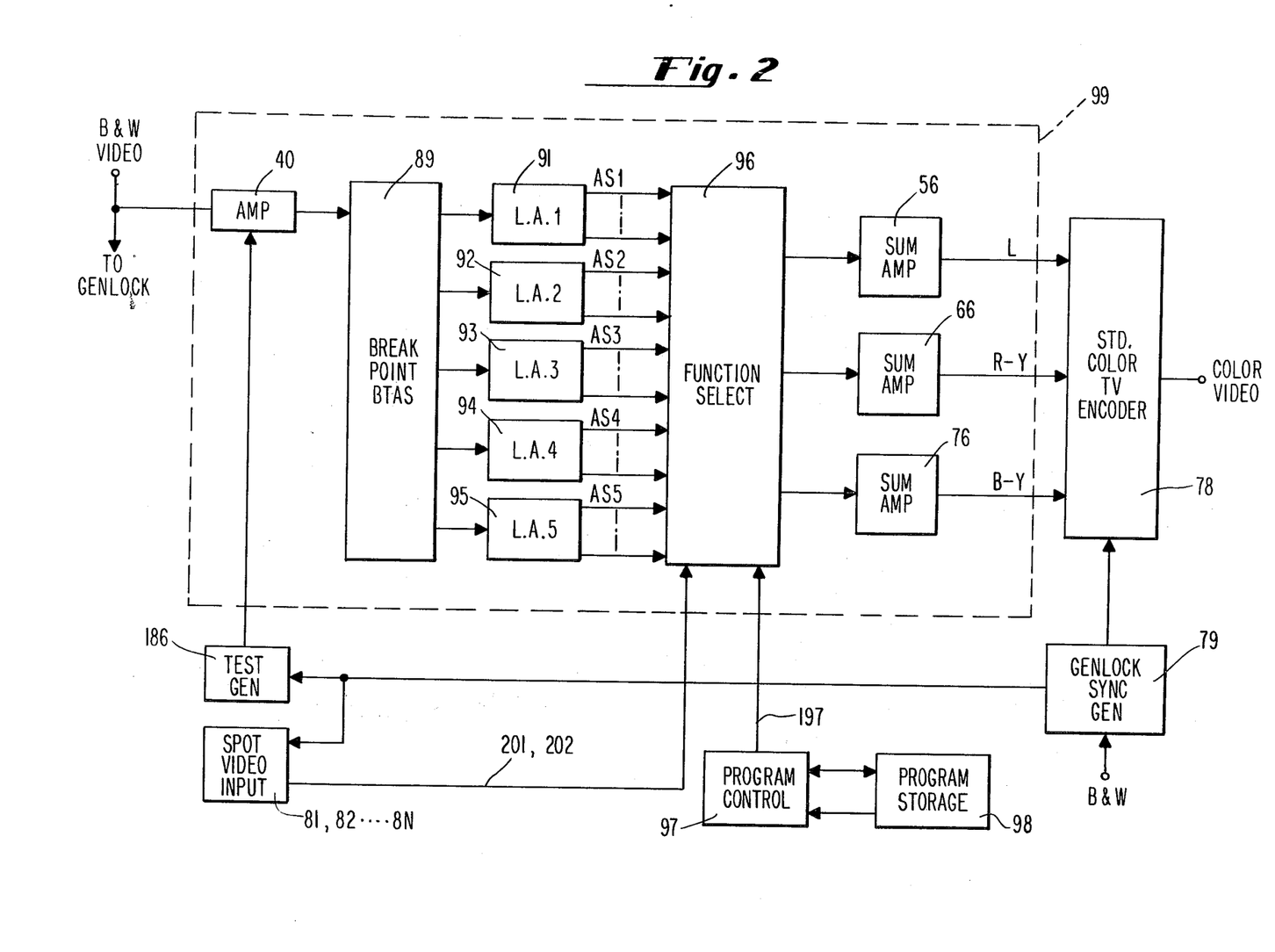
FIG. 2 is another block diagram showing different features of the function generator portion of the apparatus of this invention and its relation to the overall system.
Figures 3A, 3B:
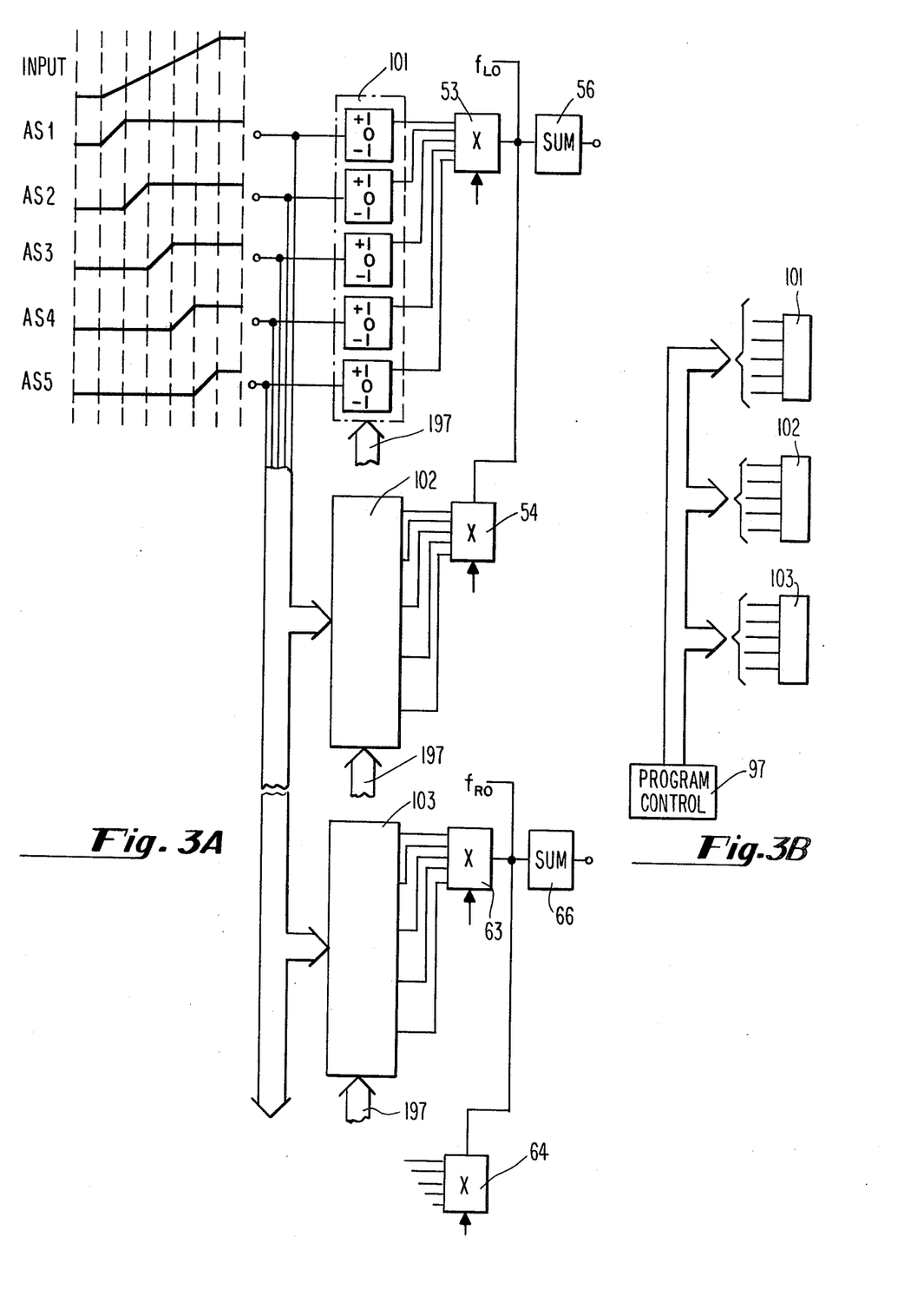
FIG. 3A is a more detailed schematic representation of the function generator logic of the apparatus of this invention.
FIG. 3B is a schematic representation of the color program control inputs to the function generator logic circuitry of this invention.

Referring now to FIG. 1, there is shown a first block diagram which illustrates the primary components of the system of this invention. The black and white video signal is inputted to an amplifier 40 of conventional design, which may contain an amplitude and black level correction portion. At the output of amplifier 40, the amplified black and white signal may optionally be passed through a signal correcting circuit 42. Signal correcting circuit 42 is a conventional circuit containing standard function generator circuitry for providing an initial overall transformation of the black and white signal. As stated, this circuit is optional, and the reason for including the circuit is discussed hereinbelow at the portion of the specification where the overall system operation is reviewed. The signal, whether or not processed by circuit 42, is then connected to a plurality of function generator circuits 50-52, 60-62, and 70-72 as shown. These function generator circuits, which are described in more detail in connection with FIGS. 2, 3A and 3B, provide for alteration of the input signal by a predetermined function, as is conventional in the art. It is to be noted that these function circuits are illustrated as being in 3 groups, which groups correspond to the L, or luminance path, the R-Y, or Red path and the B-Y, or Blue path. Although 3 generator circuits are shown for each of these paths, it is noted that in the system of this invention each path may contain any number of such function subpaths, the number being anywhere between 0 and whatever the desired upper limit might be chosen to be. Each of these function circuits provides a straight line type modification of the incoming signal, as is well known in the art. Each such circuit may be a conventional shelf item, or these circuits may be combined in a matrix as disclosed more fully in connection with FIG. 3A.

Located between the inputs to the function circuits 50-52 of the first path, and the inputs to the function circuits of the second and third paths, is a second overall function generator circuit 44. As with circuit 42, this function generator is optional. As is evident, the modification of the signal which is inputted to circuit 44 is applied to both of the color paths, but not to the black and white path. It is seen that this circuit actually has the effect of shifting the breakpoints on the input axis of the R-Y and B-Y functions and provides a rough, or gross color conversion to the two color paths, which conversion is not applied to the luminance path.

Examining the function generator group 50-52 of the luminance path, it is seen that generator 50, which provides a function $f_{L0}$, i.e., $f_{L0}$ is its transfer function, produces an output which is directly connected to a summing amplifier 56, the output of which provides the overall luminance signal designated "L". The outputs of function generator circuits 51 and 52, which introduce separate functions $f_{L1}$ and $f_{L2}$, are inputted to multipliers 53 and 54 respectively, the outputs of which are also connected to the summing amplifier. Multiplier circuits 53 and 54 take respective second inputs from area generator blocks 81 and 82. The area generators 81 and 82 may be any source, external to the source of the black and white signal, which provides an off-on type video signal corresponding to a predetermined area within the total area of the video frame or picture. Thus, by way of example, if area 1 was desired to be the upper left hand quadrant of the frame, area 1 signal generator 81 would produce a signal which, as a first simplification, would be a black and white video signal which would carry a level 1 corresponding to all portions of each line of the frame covering the upper left hand quadrant, and a level 0 corresponding to all other areas of the frame. In addition, as will be discussed in more detail in connection with FIGS. 4A-4C, the area signal is preferably "soft edged", meaning that the transition at the area boundaries from 1 to 0 or from 0 to 1 is gradual, or continuous over a predetermined range, rather than being discrete or discontinuous.

As is illustrated in FIG. 1, there may be any number of area signal sources, depending upon the number desired for the system application. The separate area signals are shown as being outputted onto lines 201 and 202, which connect respectively to multipliers 53 and 54. Since each multiplier is multiplying the function signal inputted thereto by a value between 0 and 1, it is seen that at the output of each multiplier is a signal which has been twice multiplied, namely first in accordance with the function in circuit 51 or 52, and second in accordance with the area signal. Thus, the output of multiplier 53 provides a signal component, which is added to the overall luminance signal in summing amplifier 56, which is non-zero only within the predetermined area 1. Likewise, the output from multiplier circuit 54 is summed into the composite L signal, which summed component is non-zero only within area 2. It is thus seen that the composite L signal contains separate area modification components, such that within the predetermined separate areas the color component is modified in accordance with the chosen function, e.g., $f_{L1}$ or $f_{L2}$. Note also that the different area signals may overlap if desired, or there may be no area modification whatsoever.

The operation of the Red and Blue paths, which produce signals outputted from summing amplifiers 66 and 76 respectively, is the same as that explained above for the luminance path. Each signal may be modified by one or more area signals. Since each area signal is connected to a multiplier in each path, and each path has at least one function circuit the output of which is not modified by an area signal, it is seen that maximum flexibility is provided to the system operator in choosing the manner of deriving the overall composite signal. In the simplest case, as where no area modification is required, no area signals are generated. In such a case, if plural function components such as $f_{R0}$, $f_{R1}$, $f_{R2}$, etc. are needed, the corresponding area signals are clamped to 1. Alternately, the multiplier circuits may be adjustable to provide a fixed multiplication of any value between $+1$ and $-1$, as by adjustment of a pot. Usually, however, where no area signal is employed, the function multiplier level is introduced within the function circuit, as explained below in connection with FIG. 3. In many applications the black and white signal will be connected straight through to summing amplifier 56 in an unmodified form, i.e., $f_{L0}$ has a simple transfer function (L=aV where a=1), meaning that the signal is unmodified.

Referring now to FIG. 2, there is shown a somewhat expanded version of the portions of the system by which function modifications are made in generation of the Luminance, Red and Blue signals. The black and white video signal, after being amplified in amplifier 40, is connected to breakpoint bias circuit 89. This circuit contains conventional circuit components for providing breakpoint DC bias inputs to limiter amplifiers 91-95, which in turn may be conventional items which limit the output at a predetermined value, as is well known in the art. By biasing the inputs with the breakpoint bias circuitry 89, the linear range of each of the amplifiers 91-95 is predetermined. The outputs of amplifiers 91-95, being amplitude segments 1-5, designated AS-1-AS5, are inputted to function select circuitry 96. This circuitry chooses, corresponding to each of the function generator blocks 50-52, 60-62, and 70-72 shown in FIG. 1, the desired amplitude segments which are combined to provide the respective functions. Block 96 also comprises the multipliers 53, 54, 63, 64, 73 and 74, and with the inputs from the spot, or area video blocks 81, 82 and the input from program control source 97, provides the respective component signals which are inputted to summing amplifiers 56, 66 and 76 for generation of the Luminance, Red and Blue signals. The output from program control circuit 97, which is shown as being communicated on line 197, goes to each of the function generator circuits as additional input by which the operator controls selection of the various amplitude segment signals, as is explained further in connection with FIGS. 3A and 3B.

The system as illustrated in FIG. 2 contains a conventional Genlock type sync generator 79, which receives the initial black and white video signal. The sync generator output is connected through to the spot video sources 81, 82, test generator 186, and the standard color TV encoder 78 which receives the L, R-Y and B-Y signals and combines them to provide the composite color video output signal. It is understood that the matrix of logic circuitry within dashed block 99 may be arranged to produce standard Red, Green and Blue signals, or any other desired combination. The system is unlimited in its ability to handle high resolution video signals or any plural signal format as desired for any end application such as TV, films, etc. Test generator 186 provides a test output which may be used by the operator as an aid in determining the different colors which are produced by different function generator settings. A program storage device 98 is also provided, in connection with program control 97, for providing frequently used color information program signals.

Referring now to FIG. 3A, the amplitude segment inputs, which are illustrated in the upper left hand portion of the figure, are inputted to logic circuit blocks 101, 102 and 103 respectively, which are coupled to multipliers 53, 54 and 63. Each of logic circuit blocks 101-103 contains, in this illustration, five logic circuits for either passing the amplitude segment (+1), blocking it (0) or inverting it (-1). These logic functions are conventional circuitry, and indeed circuits 101-103 are available commercially as conventional integrated circuits. The output of each of the $+1/0/-1$ logic circuits is inputted to the respective multiplier circuit 53, 54, 63, 64, 73 or 74, the outputs of which are summed in the summing amplifiers. Thus, focusing on the Luminance channel, the $f_{L1}$ function, as shown being generated in block 51 of FIG. 1, is derived by summing the outputs from logic circuit block 101. These outputs constitute operator selected amplitude segments, thus providing a 5 segment function generator. The respective outputs are summed at a summing point at the input to multiplier 53, which may suitably comprise a standard operational amplifier. It is thus seen that by making one of the 3 logic selections for each of the 5 logic components of logic circuit 101, the operator is able to select a specific one of a large number of possible functions for modification of the signal. It is to be understood that, while a 5 segment function generator is illustrated, any number of segments may be utilized, in accordance with design considerations. In practice, it has been found that the amplitude segment components of a function will not necessarily be equally spaced on the input axis. However, the exact manner of generating each function is a matter of choice, and is not limiting insomuch as the scope of this invention is concerned.

Still referring to FIG. 3A, inputs 197 are shown going into each of the logic circuit portions 101, 102 and 103. These inputs, there being 5 for each of the logic circuit blocks of each of the 3 paths, carry signals for making the logic selection of +1, 0 or −1. These logic signals, as generated in program control block 97, are the means by which the operator actually makes the selections of the precise functions. As is well understood, the logic circuits may be replaced with equivalent devices, such as continuously adjustable pots giving logic functions that multiply by a constant within a continuous range of +1 to −1 when fed by the signal and its inversion at its ends. In that case, the functions are set manually by the operator. For more automatic control, the signals on lines 197 may be digital signals inputted from any desired source, such as magnetic tape, etc., which control a four quadrant multiplier. There is, as is understood, no limitation in the manner of generating the program control signals.

As shown in FIG. 3B, the output of program control circuit 97 comprises 5 leads for each of the function logic blocks such as 101-103. If each of the 3 main paths contains N function paths, and the logic circuit block for each subpath contains X of the +1/0/−1 logic control circuits, then a total of 3 NX control signal paths emanate from program control block 97. Program control block 97 may suitably contain a keyboard for entry of logic signals, switches, or any other conventional means by which the operator can communicate with it. Program control 97 may be adapted to receive a signal from the sync generator 79, not shown, for use in automatically inserting the color program data in combination with program storage device 98.

Summarizing at this point, each path produces a combined signal as follows:

$$L = f_{L0}(V) + A_{L1}f_{L1}(V) + \ldots A_{LN}f_{LN}(V)$$

$$R-Y = f_{R0}(V) + A_{R1}f_{R1}(V) + \ldots A_{RN}f_{RN}(V)$$

$$B-Y = f_{B0}(V) + A_{B1}f_{B1}(V) + \ldots A_{BN}f_{BN}(V)$$

where V is the inputted video signal and the A functions are area modification functions.

The functions may include positive or negative values out for positive values of V in. Thus, adding the modifying functions can, if desired, cancel the output of the other functions.

FIGS. 1-3 illustrate a system employing a plurality of subpaths for making up each function and area-modified primary signal, which system permits real time modification of a video signal. It is to be noted that other equivalent techniques may be used. For example, any of the signals may be generated with one path. Thus, in generating the L signal, the data corresponding to $f_{L0}$, $f_{L1}, \ldots f_{LN}$, plus data representing the $A_{L1}, A_{L2}, \ldots A_{LN}$ functions may all be inputted to a hard-wired or programmed computer which calculates the L signal according to the above formula. It is not necessary that the video signal be altered by separate transfer functions in separate circuits to produce separate signals that are then summed. Instead, the different color converting transfer functions and area transfer functions may be logically combined to directly modify the video signal so as to generate the desired color converted area modified resultant signal. Likewise, it is to be understood that the time sequence of performing the functions called for is a matter of choice. Thus, the video signal may first be modified by the area signal and then be modified in accordance with the transfer functions and vice versa, or both modifications can be carried out together. In summary, although the embodiment of FIGS. 1-3 is presently preferred from a hardware point of view, as well as for ease of operation, the system embraces equivalent analog and digital circuitry and accompanying input/output equipment, for performing the same essential steps of color conversion and area modification.

Figure 7A:
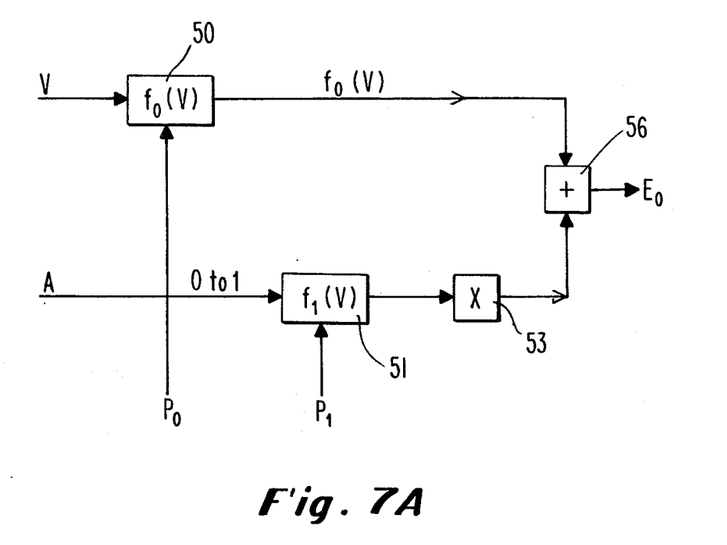
FIG. 7A is a simplified block diagram of a 2 path system for generating an area modified color converted video signal.
Figure 7B:
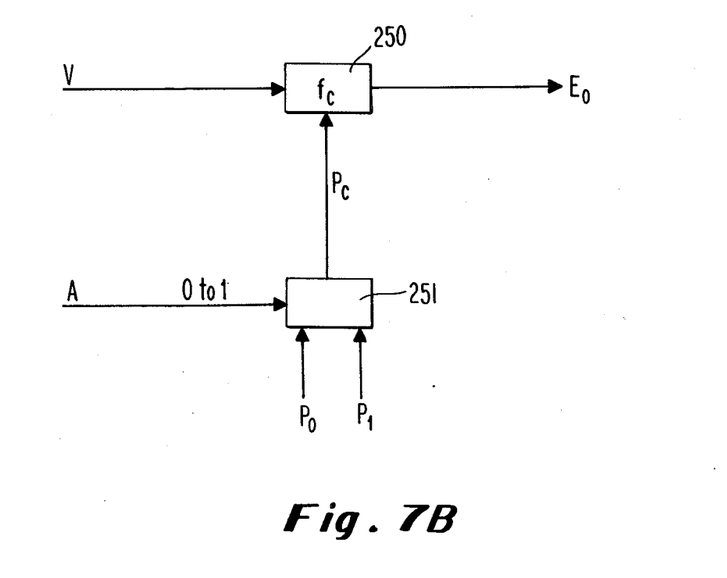
FIG. 7B is a simplified block diagram of a 1 path system which is the function equivalent of the 2 path system of FIG. 7A.

By way of example of the foregoing, FIGS. 7A and 7B illustrate dual path and single path variations. FIG. 7A illustrates a portion of FIG. 1, showing two subpaths which are combined to modify the video signal in accordance with the equation $E_0 = f_0(V) + Af_1(V)$. Color program data $P_0$ is inputted to block 50 to establish the transfer function $f_0$, while data $P_1$ is inputted to block 51 to establish the transfer function $f_1$. In FIG. 7B, there is illustrated a single circuit block 250 which modifies the input in accordance with transfer function $f_c$. However, $f_c$ in turn is established by program data $P_c$ from circuit block 251, and $P_c$ in turn is obtained by combining the $P_1$ and $P_2$ data inputs in accordance with the inputted area signal A. Where A varies from 0 to 1, $P_c$ is modified in accordance with the illustrated formula $P_c = AP_1 + (1-A)P_0$, such that function $f_c$ effectively varies from $f_0$ to $f_0 + f_1$ so as to produce the same $E_0$ as in the arrangement of FIG. 7A. Note that in the arrangement of FIG. 7B, the combination circuit may operate upon the program parameters in any desired manner to modify the program data. Additionally, the arrangement of FIG. 7 may be further modified so that all function modification takes place in one box, e.g., a digital computer, which receives the video input, the area signal input, and the color parameter input, and produces the color converted area modified video.

Figure 4A:
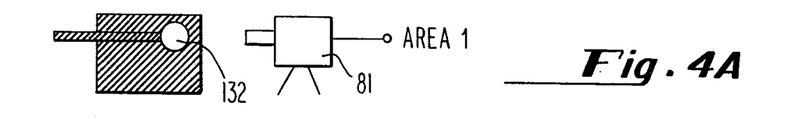
FIG. 4A is a schematic representation of a first means for generating an area signal for use in the apparatus and method of this invention.
Figure 4B:
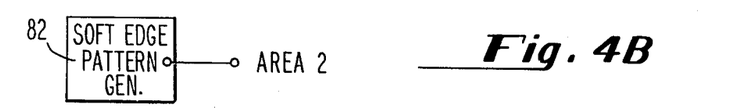
FIG. 4B is a second schematic representation of a second means for generating an area signal for use in the system and method of this invention.
Figure 4C:
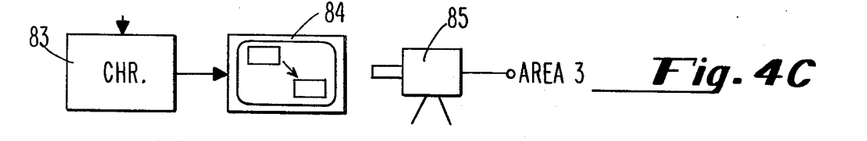
FIG. 4C is a third schematic representation of a third means for generating an area signal for use in the apparatus and method of this invention.

Referring now to FIGS. 4A, 4B and 4C, there are illustrated 3 means for generating desired area signals. In FIG. 4A, there is shown a schematic representation of the simplest method of providing the area signal. A black and white camera 81, which will be the source of the black and white area signal, is pointed toward a black background on which is superimposed a white area 132 which is illustrated as being circular. The black background may be provided, for example, by simply having a black sheet of paper or other covering material mounted on an easel or like device. The white area may be provided, for example, by simply attaching a piece of white paper to the end of a stick, and holding same in front of the black background. The white area target may, of course, be moved around from position to position, corresponding to the desired animation of the area. The camera 81, which is fixed upon the background, produces a signal which is all black except for the white area, which white area will move in accordance with the operator's manipulation, such that the output of camera 81 is a black and white video signal, synced through generator 79 to the black and white video signal which is being color corrected. Assuming that the white target 132 is a physical object such as a piece of white paper or stiff cardboard which is placed in front of the black background, the area signal is discontinuous at its outer boundaries, such that the area video signal from camera 81 is normally discontinuous at the point where each line of the frame crosses the area boundary. By defocusing camera 81, it is possible to make the area edge soft to any desired degree, in the sense that the area video signal is continuous in changing from black to white and from white to black at the edges of the area. This is an important function, since it enables a gradual and continuous transition of the area modified signal which is added to the composite color signal, such that the viewer sees no transition line corresponding to the area signal.

FIG. 4B represents any type of electronic generator, which is commercially available, for generation of a soft edge pattern, or area signal. There are presently a large number of function generators, as well as programs of digital computer generation of a wide variety of sophisticated function signals. Such shelf items may be employed to generate the desired area signal. As with all of the area generators used in the system of this invention, the generator must be synchronized with respect to the black and white video signal which is being color converted.

FIG. 4C illustrates a particularly versatile arrangement for generating area signals applicable for use in the system and method of this invention. Block 83 represents a Chromaton type device, made by the assignee of this application, which is covered by U.S. application Ser. No. 645,633, titled "Color Video Synthesizer With Improved Image Control Means", issued as U.S. Pat. No. 4,021,841 which is incorporated in its entirety by reference. The Chromaton type device is a versatile piece of equipment designed to generate moving images on a TV monitor such as illustrated at 84, the movement of the images being controllable through the Chromaton. A video black and white camera 85 is trained upon the screen of the monitor 84 being driven by Chromaton device 83, the output of camera 85 thus being a black and white area video signal suitable for use in the system and method of this application. It is to be noted that other forms of area signal generators not specifically mentioned may be utilized with this invention, the invention not being limited to the precise device used to generate the area signal. It is, of course, necessary that the area signal generator be capable of providing a moving area image signal, and preferably also a signal having soft area edges. In all cases, the area signal may be displayed on a TV monitor in combination with the original black and white signal to be colored in such a manner as to permit easy positioning by the operator to desired areas.

Figure 5:
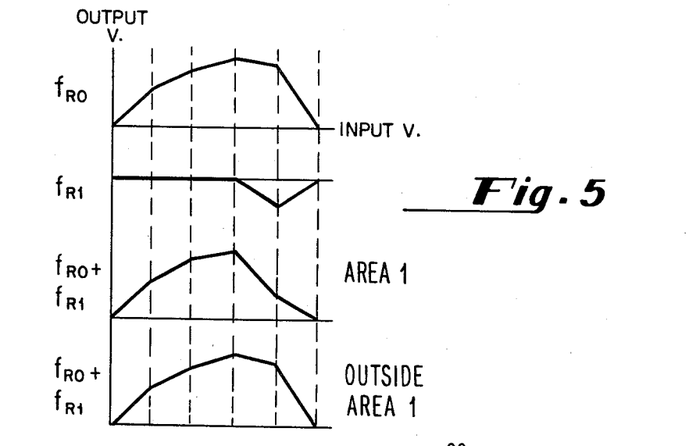
FIG. 5 shows 4 function graphs which illustrate area modification and color conversion transfer functions as used in the apparatus and method of this invention.

Referring to all of the above discussion, and also to FIG. 5, the method of operating the system of this invention can now be explained in detail. The operator is the ultimate source of the color information inputted to the system, i.e., the means by which information relating to the desired color correction is inputted to the system. This is an important feature of the system and method of this invention, for it permits an operator to input the necessary subjective information into the color conversion process, which is highly desirable inasmuch as the evaluation of the final product is not made strictly in terms of color information content, but rather is in fact a very subjective evaluation. The operator is permitted to introduce his artistic input into the final product which enables a result which is far superior to anything which can be obtained by simply color converting on the basis of a predetermined formula. In making a color conversion of a given piece, i.e., a movie or other subject, the operator may have for his or her use any other standard video type equipment which is available, i.e., means for monitoring both in black and white and color, means for holding the video still at a given frame while function corrections are made, means for slowing down the frame speed so that area animation may be made more easily, etc.

In the process of color converting, if the operator, either through experience or through prior viewing of the black and white piece, or both, is of the opinion that a certain portion is adaptable to first order color conversion with a given predetermined function, such function may be inserted at block 42. Block 42 effectively modifies the original Black and White signal to conveniently compensate for original source grey scale variations from a selected norm. It is noted that this would, by itself, provide an overall color conversion, which could be adjusted by introducing one or more functions in any one of the three basic paths, and/or by additional area modification. Likewise, and especially where it is desired to leave the L signal exactly as originally found, an initial overall function modification may be made at circuit 44. Block 44 effectively moves the present function breakpoints for the R-Y and B-Y paths along the V axis, without affecting the luminance component.

For any sequence of the black and white video which is being color converted, after determination of whether to fix a function at either block 42 or 44, the operator proceeds to fix any other functions and area modifications as desired. The operator has complete flexibility with respect to the order of establishing the functions, the only requirement being that the functions be set, i.e., the logic for each function circuit be determined and fixed, between frames, which functions are then set for as many succeeding frames as desired by the operator. When the video progresses to a point where it is felt that a modification must be made, either overall or by one or more areas, the process is stopped and one or more new functions in any one of the three main paths may be added, or functions which had been incorporated may be deleted. In practice, by way of illustration, the operator may initially set $f_{L0}$ to 1, and insert no function at 51 and 52, i.e., set $M_1$ through $M_n = 0$, such that the output of summing amplifier 56 is precisely the amplified black and white signal which is produced at amplifier 40, i.e., $L = V$. Following this, a first color conversion may be made at circuit 60 by introducing $f_{R0}$. This is done either by inputting logic signals from program control 97, or physically adjusting potentiometers in place of the logic circuitry as illustrated at 101–103 of FIG. 3A. Following this, a comparable function input is provided at block 70, providing a signal which is the black and white signal modified by $f_{B0}$. If, following this first programming of the Red and Blue channels, it is desired to make more overall color conversion, either based on areas or continuously varying in time, additional function components may be introduced at blocks 61, 62, 71 and 72, as seen in FIG. 1.

It is important to note that, at each time a different function component is introduced, the components which had already been established are unaltered. Of course, the function generators may be set to produce negative signals, in which case color conversion is actually made by subtracting certain components from the established color program.

When the overall color conversion has been made, the operator then makes a determination as to what, if any, areas need further modification. Assuming, for example, that the picture contains one or more faces, the flesh tones of which simply do not look good, one of the area generating sources 81, 82 may be utilized to generate an area signal which encompasses the face or other fragment of the total area of the frame and which needs additional color conversion. Referring to FIG. 5, there are shown curves which illustrate the manner in which additional color conversion is controlled by the area signal. The function $f_{R0}$ is shown in the top graph, this being the first function which modifies the black and white signal to obtain a component of the R-Y signal. The diagram designated $f_{R1}$ illustrates a function which is 0 for approximately the lower 60% of the grey range from black to white, but which goes negative for the upper 40%. This function, when used to modify the black and white signal, produces a negative output only corresponding to grey levels toward the upper end of the range, i.e., toward the upper 40% of the range. Thus, when the black and white signal which is modified by $f_{R1}$ is added to the black and white signal which is modified by $f_{R0}$, the only change, as seen in the third graph, results with respect to grey levels in the upper 40% of the overall grey range. However, when the signal modified by $f_{R1}$, which is produced at the output of block 61, is multiplied by the area 1 signal which is inputted to multiplier 63 on line 201, the modification occurs only within area 1. Thus, the total modification represented by $f_{R0} + f_{R1}$ is the same outside area 1 as is the modification function $f_{R0}$ along. Only within area 1 is the modification function changed due to the addition of $f_{R1}$. If the limited grey level range, within area 1 where $f_{R1}$ is applicable, is confined to a subarea which is within the edges of area 1, then there is in fact no area color modification right at the boundary of the area and the color modification is thus inherently confined to the desired area. The boundary of the modification area, being at a grey level where both functions are the same, is consequently invisible.

To extend the example further, if the operator is color correcting the flesh tones of a face which is positioned within a given area, and the black and white signal produces grey levels which appear within that area only where the face is, then the area modification takes place only at the face, such that effectively a natural area boundary has been achieved. This gives the operator latitude in establishing the boundaries of the area, the principle being to maintain the area such that its outer boundaries are always at least a small distance separated from the actual portion within the area boundaries which is to be further color converted. This is especially important in animated color conversion, where the color sensitive target, such as a person's face or any moving object, is actually changing its relative position with respect to the overall frame. The operator need only manipulate the target signal so that at all times the target boundaries envelope the particular area which is to be specifically color compensated. Additionally, by making the target boundaries soft edged, this system reduces the likelihood of an area which is subjectively discrenible by the viewer. Of course, it is to be understood that the invention places no limitations on the technique of the operator in choosing and applying color conversion.

As another example of color programming, consider the example where the operator desires to color convert only a relatively small target within the picture, the movement of such target being known to the operator by previewing. In this situation the operator can generate a fixed area signal which includes all of the positions into which the target will move in a predetermined succeeding number of frames, and apply such a signal for such number of frames. In this case, even though the target may move from one side of the screen to the other, it is within the fixed area at all times, and will receive the same color conversion.

In most applications, once the area signal or signals are established, the operator runs the video conversion process over a large number of frames, permitting rapid working of the process. Of course, the area signals may be moved in real time during such running. When the picture reaches the point where the operator desires to change the color conversion, either by changing a color function or by changing an area signal, the new program data is introduced between successive frames of the video signal.

Figure 6:
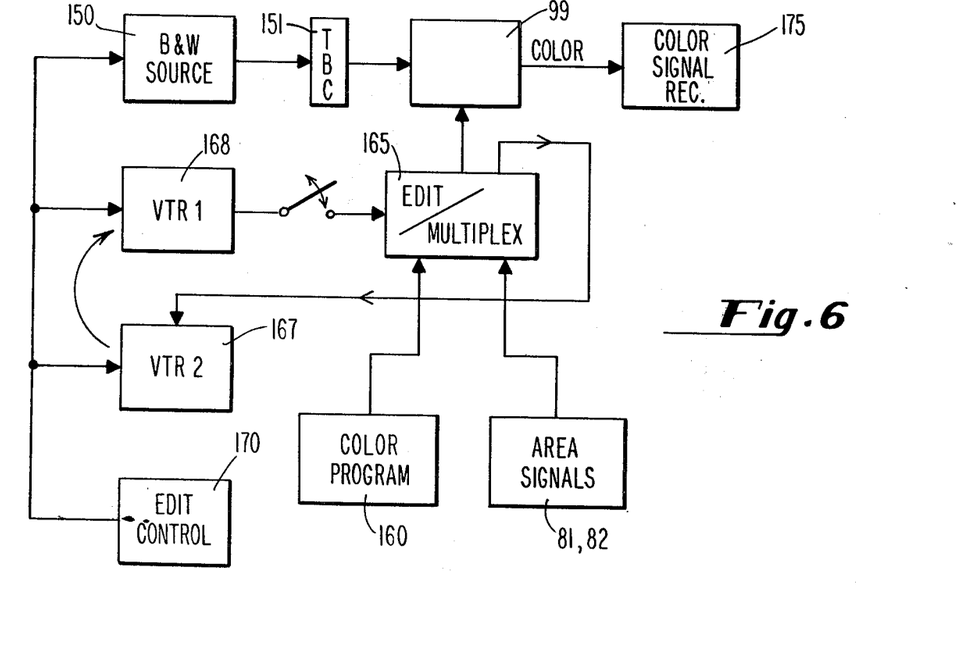
FIG. 6 is a block diagram showing an arrangement for editing and storing a color program for color conversion of a black and white video signal in accordance with the process of this invention.

Referring now to FIG. 6, there is shown a block diagram of an arrangement for editing the color program on a step by step basis. The black and white video source 150 is suitably connected through a time base corrector circuit 151 to the color converting circuitry 99, as designated by the dashed line block in FIG. 2. The color output signal from circuitry 99 may be monitored directly or stored in color signal recorder 175. The information for controlling the color converting process is inputted to circuitry 99 from the edit/multiplex block 165. In turn, block 165 receives area signals from generators 81, 82 and the color program information from source 160. As discussed hereinabove, the area signals are synchronous video signals representing operator selected areas corresponding to a portion or portions of the video picture, while the color program data corresponds to the color selection signals communicated on lines 197 to the function logic blocks such as 101-103. The circuitry in block 165, which may be assembled from standard commercially available circuitry, passes the signals through to circuitry 99, and at the same time combines it for storing in VTR 2 designated at 167. VTR 2, as well as the black and white source, are controlled by a conventional edit control unit 170 which maintains a frame correlation of all players and recorders. Frame identification data is conventionally stored either on a tape control track or during the vertical interval between frames. The encoded color program data from input 160 is inputted and recorded during the vertical interval. The information stored on VTR 2 thus contains the color modification and area data, synced properly to the black and white video signal, as well as the frame identification information.

In operation, the operator of the system of this invention inputs the color program data and area information to the color conversion circuitry through block 165. Block 165 also processes the program data and area signal data for storage at VTR 2. Area data and program data may be encoded and multiplexed on one tape, and then decoded when played back; or a number of recording devices may be used simultaneously for individual signals. If the operator then wishes to further edit the color converted video, such as by providing further color correction to one or more areas, the tape recorded signal at VTR 2 is switched into VTR 1, shown at 168, while a new tape is placed into the VTR 2 machine, or VTR 1 and VTR 2 may be interchanged. The operator then introduces additional, or supplemental color program and/or area data, while at the same timing inputting the initial program from VTR 1 to the edit multiplex circuit 165. The resulting color information which is passed through to circuit 99 is the initial data coming from 168 plus the newly added data coming from 160 and/or 81, 82. The operator may delete some or all of the initial data if desired. In this manner, the operator can go through any desired number of editing sequences, and each time modify, or further edit the prior program data. It is seen that this arrangement is particularly useful for an application where a program had been color converted at some time in the past, and it was desired to make a further color conversion.

It is thus seen that there is disclosed an extremely flexible system and method for color conversion of video signals. This system provides, through the multiple function paths and the means for modifying the function paths, substantially continuous flexibility in modifying the video signal. It is to be understood that the system may be composed of standard shelf items, and that one of ordinary skill in the art may make, without any further teaching, any desired adjustments to ensure proper synchronization, and the like. As used herein, the term "area" or "area of the video signal", refers to a portion of the total picture which is produced by the video signal, i.e., a portion of the image which is produced by a frame between vertical intervals. Stated in another way, the term "area" refers to that portion of the video signal which, when applied to the TV screen, produces a corresponding portion of the total image on the screen which is defined by a certain boundary. The terms soft boundary and soft edge refer to the fact that the area signal is not abrupt or discontinuous at the area boundaries, but rather represents a gradual transition centered about the selected boundaries. Also as used herein, the term color conversion refers to any processing or modification of an initial video signal, whether such initial signal is entirely black and white or already contains some color components, whereby the resulting video signal has a changed color component. In other words, while color conversion normally relates to adding color components to the video signal, it may also refer to deleting or revising color components.

I claim:

1. Apparatus for color conversion of an input video signal, said input video signal representing a plurality of frames defining a moving image, comprising:

a. a first circuit path having first function means for color modifying said input video signal according to a first predetermined function, thereby producing a first color converted signal;

b. a second circuit path controlled independently of said first path, comprising second function means for providing video color conversion according to a second predetermined function, in combination with area modifying means for video transformation which provides modification of an area of the image defined by a video signal, said second function means and said area modifying means being operatively combined to transform said input video signal into a second area-modified color converted signal; and c. combining means for combining said first and second signals.

2. The apparatus as described in claim 1, wherein said area modifying means comprises an area signal generator for generating a video area signal corresponding to said area, and a transfer function circuit for modifying any video signals as a function of said area signal.

3. The apparatus as described in claim 2, wherein said area signal generator comprises means for generating an area signal corresponding to a moving area.

4. The apparatus as described in claim 2, wherein said area modifying means has a transfer function of 0 which is applied to video signals which represent images outside of said area and a predetermined constant transfer function which is applied to said video signals which represent images within said area.

5. The apparatus as described in claim 2, wherein said area signal generator generates an area video signal representative of a soft edged area.

6. The apparatus as described in claim 3, wherein said area signal generator is controllable to generate a moving area video signal having soft boundaries.

7. The apparatus as described in claim 1, comprising a plurality of primary modifying paths, each of such primary paths having a plurality of subpaths, at least one of said subpaths of each primary path containing a respective one of said second function means for modifying video signals according to a respective second function in combination with a said area modifying means for jointly producing an area modified color converted subpath signal, summing means for summing the outputs of said subpaths of each primary path to provide primary color converted signals, and input means for inputting path signals to each primary path, said path signals being derived from said input video signal.

8. The apparatus as described in claim 7, wherein each of said second function means is controllable for controlling the said respective second function.

9. The apparatus as described in claim 7, wherein each of said primary paths comprises a subpath having a respective first function means for modifying said path signals according to a respective first function.

10. The apparatus as described in claim 9, wherein each of said first and second function means contains logic circuitry for receiving digital control signals, whereby each of said respective functions is controllable in discrete steps.

11. The apparatus as described in claim 9, wherein each of said function means contains analog control circuitry for enabling variation of each of said functions.

12. The apparatus as described in claim 7, wherein each of said area modifying means comprises an area signal generator, each of said area signal generators being controllable to generate a respective area video signal corresponding to a respective area of the image represented by said path signals.

13. The apparatus as described in claim 10, comprising color program data input means for inputting color program data to selected ones of said function means.

14. The apparatus as described in claim 7, wherein said function means are controllable by data inputted thereto, and comprising color program data input means for inputting color program data to selected ones of said function means.

15. The apparatus as described in claim 14, comprising storage means for storing color program data and area signals inputted to said selected function means and to corresponding ones of said area modifying means.

16. The apparatus as described in claim 7, wherein said primary paths comprise a Luminance path, a Red path and a Blue path, and said primary path is adjustable to pass said inputted video signals in an unchanged state.

17. The apparatus as described in claim 12, wherein each of said area generators comprises means for moving its respective area.

18. The apparatus as described in claim 7, comprising three of said primary paths for generating signals containing information translatable to standard Luminance, Red and Blue TV signals.

19. The apparatus as described in claim 7, wherein said primary paths comprise a Luminance path, a Red path and a Blue path and said input means inputs common video signals to said Red path and said Blue path, and comprising a first color function circuit for first color conversion of said common inputted video signals.

20. The apparatus as described in claim 7, wherein said input means comprises a primary color conversion circuit for color conversion of said input video signal prior to said primary paths.

21. The apparatus as described in claim 4, wherein said area modifying transfer function varies gradually from 0 to said constant at the boundaries of said area.

22. The apparatus as described in claim 1, wherein said first circuit path comprises a circuit for producing a continuous converted signal without area modification.

23. A method for color conversion of video signals, comprising:
   a. color converting said video signals according to a first function of grey level alone to produce a first color converted signal;
   b. performing upon said video signals the combined operation of color converting according to a second function which is independent of said first function and area modifying to modify an area of the image defined by said video signals, to produce an area modified color converted signal; and
   c. combining said first color converted signal and said area modified color converted signal to produce a composite color converted video signal representing one or more frames having modified color conversion within a selected area.

24. The method as described in claim 23, wherein said area modifying comprises generating a video area signal corresponding to a selected area, and area modifying video signals in accordance with an area transfer function derived from said video area signal.

25. The method as described in claim 24, wherein said area transfer function is substantially 0 corresponding to portions of said video signals outside of said area and a predetermined constant corresponding to portions within said area.

26. The method as described in claim 24, wherein said generated video area signal corresponds to a moving area.

27. The method as described in claim 24, wherein said video area signal generating step comprises generating a soft edged area signal.

28. The method as described in claim 24, comprising determining a portion of the image defined by said video signals for color conversion, and selecting the boundaries of said selected area to be outside of said portion.

29. The method as described in claim 28, comprising choosing said second function so that said combined operation color converts only video signals corresponding to said determined portion, whereby no color conversion takes place at said area boundaries.

30. The method as described in claim 28, comprising predetermining the movement of a given image portion of said video signals over a predetermined number of frames, and selecting said area boundaries to embrace said movement.

31. The method as described in claim 23, wherein said second function is negative at least in part.

32. The method as described in claim 23, wherein said composite signal represents a first primary color signal, and synchronously generating at least one additional respective like primary color signal.

33. The method as described in claim 32, wherein the generating of each of said primary color signals comprises generating a plurality of respective color converted signals and summing said plurality of signals.

34. The method as described in claim 33, comprising generating respective area signals and area modifying selected ones of said plurality of color converted signals with said area signals.

35. The method as described in claim 33, comprising controlling the function by which each of said plurality of signals is color converted.

36. The method as described in claim 35, comprising generating color program data representative of said function by which each of said plurality of signals is color converted, and carrying out said controlling in accordance with said program data.

37. The method as described in claim 36, comprising generating said program data in successive steps, and editing and storing said program data and said area signals.

38. The method as described in claim 32, wherein said first primary color signal is a Red signal, an additional primary color signal is a Blue signal, and comprising generating a Luminance signal from said video signals.

39. The method as described in claim 38, wherein said generating of said Luminance signal involved modification of said video signals with a transfer function which is only a constant.

40. The method as described in claim 39, comprising first color converting black and white video signals according to a predetermined color program to generate said video signals.

41. Apparatus for selective color conversion of a video signal representing a changing image, comprising:
   a. means for modifying said video signal by continuously color converting said video signal in accordance with a first function and modifying a selected area of said signal in accordance with a second function, to generate a color converted area modified video signal;
   b. means for obtaining a Luminance video signal from said video signal; and
   c. means for summing said color converted area modified video signal and said Luminance video signal.

42. The apparatus as described in claim 41, wherein said modifying means comprises means for generating at least two independently color converted signals and means for combining said at least two color converted signals.

43. The apparatus as described in claim 42, comprising three primary paths for generating respectively said Luminance signal and two color converted signals, and wherein each of said primary paths for producing color converted primary signals comprises a plurality of subpaths for producing color converted subpath signals and a summer for summing said subpath signals.

44. The apparatus as described in claim 41, wherein said modifying means comprises a single path, and comprising program data input means for inputting to said modifying means a plurality of color conversion data signals and at least an area signal, whereby said means color converts as a function of said color conversion data signals and modifies said selected area as a function of said area signal.

45. The apparatus as described in claim 43, wherein each of said subpaths comprises a controllable transfer function circuit for modifying the video signal inputted thereto by a selected function.

46. The apparatus as described in claim 43, comprising a plurality of area signal generators, and wherein at least a plurality of said subpaths comprise area modifying circuits in combination with respective ones of said area signal generators for modifying selected areas in said subpath circuits.

47. The apparatus as described in claim 45, comprising means for generating color program data signals for controlling said controllable transfer function circuits and program means for selectively inputting color program data signals to said transfer function circuits.

48. Apparatus for area selective color conversion of a black and white video signal, comprising:
   a. a plurality of area signal generating means, each having an area signal generator for generating an area signal corresponding to a respective area of said video signal;
   b. means for modifying said video signal to obtain a plurality of color converted area modified signals, said modifying means having a plurality of circuit paths, each path having function circuit means with a respective selected transfer function for providing color conversion and area modifying circuit means for receiving a respective one of said area signals and providing modification of a respective selected area of said video signal; and
   c. summing means for summing said plurality of color converted area modified signals.

49. The apparatus as described in claim 48, comprising function means for deriving a signal from said video signal which is modified only as a function of grey level, and combining means for combining said grey level modified signal and said color converted area modified signals to provide a primary signal.

50. The apparatus as described in claim 49, comprising a plurality of such apparatus combinations, each respectively color converting said video signal to provide a plurality of respective primary signals.

51. The apparatus as described in claim 48, wherein said area signal generators generate area signals corresponding to soft edged areas.

52. A method for color converting a video signal which defines a changing image, comprising:
   a. monitoring said changing image while continuously color converting said video signal according to a first function;
   b. selecting for additional color conversion a first area of said changing image;
   c. selecting a larger area enveloping said first selected area;
   d. color converting said video signal within said larger area according to a different function, whereby said larger area receives additional color conversion; and
   e. selecting succeeding larger areas of said changing image which track said first area as it moves, and additionally color converting said video signal within said succeeding larger areas according to said different function while also continuously color converting all of said video signal according to said first function.

53. The method as described in claim 52, comprising selecting a plurality of said first areas of additional color conversion, selecting a plurality of respective said larger areas, and additionally color converting in accordance with respective different conversion functions within said larger areas.

54. The method as described in claim 52, wherein said selected area moves in succeeding time portions, and said larger area is selected to continuously envelope said selected area, and additionally color converting said video signal according to said different function within said larger area for said succeeding time portions.

55. The method as described in claim 52, wherein said color converting is performed only on grey levels found within said video signal is initially a black and white television signal, and said selected first area.

56. The method as described in claim 52, wherein said additionally color converting corresponds to a selected different function, and changing said different function during succeeding respective time portions of said video signal.

57. The method as described in claim 56, wherein said changing is performed between frames of said video signal.

58. Apparatus for color conversion of a video signal defining a moving image, comprising:
   a. input means for providing color program data signals time coordinated with said video signal;
   b. area signal means for providing at least one area video signal synced with said initial video signal; and
   c. circuit means for transforming said initial video signal by color converting certain selected portions of said video signal which produce selected respective areas of the total image produced by said video signal, said circuit means including means for varying at least one of said portions with time to track a predetermined one of said areas as it moves, and means for carrying out said color converting under control of said color program data signals; and
   d. said circuit means comprising a plurality of paths, and said input means having means for inputting a color program data signal to each of said paths.

* * * * *

UNITED STATES PATENT AND TRADEMARK OFFICE
CERTIFICATE OF CORRECTION

PATENT NO. : 4,149,185
DATED : April 10, 1979
INVENTOR(S) : Ralph Weinger

It is certified that error appears in the above-identified patent and that said Letters Patent are hereby corrected as shown below:

Column 10, line 2, change "corrections" to --conversions--.

Column 11, line 26, change "along" to --alone--.

Column 13, claim 2, line 63, after "signals" insert --inputted thereto--.

Signed and Sealed this

Eighteenth Day of December 1979

[SEAL]

Attest:

Attesting Officer

SIDNEY A. DIAMOND

Commissioner of Patents and Trademarks